United States Patent
Berkovitz et al.

(10) Patent No.: US 9,607,117 B2
(45) Date of Patent: Mar. 28, 2017

(54) METHOD AND APPARATUS FOR CALCULATING DELAY TIMING VALUES FOR AN INTEGRATED CIRCUIT DESIGN

(71) Applicants: Asher Berkovitz, Kiryat-Ono (IL); Michael Priel, Netanya (IL); Sergey Sofer, Rishon Lezion (IL)

(72) Inventors: Asher Berkovitz, Kiryat-Ono (IL); Michael Priel, Netanya (IL); Sergey Sofer, Rishon Lezion (IL)

(73) Assignee: NXP USA, Inc., Austin, TX (US)

( * ) Notice: Subject to any disclaimer, the term of this patent is extended or adjusted under 35 U.S.C. 154(b) by 8 days.

(21) Appl. No.: 14/650,319

(22) PCT Filed: Jan. 8, 2013

(86) PCT No.: PCT/IB2013/050151
§ 371 (c)(1),
(2) Date: Jun. 8, 2015

(87) PCT Pub. No.: WO2014/108735
PCT Pub. Date: Jul. 17, 2014

(65) Prior Publication Data
US 2015/0310152 A1 Oct. 29, 2015

(51) Int. Cl.
*G06F 17/50* (2006.01)
*H03K 3/037* (2006.01)

(52) U.S. Cl.
CPC ...... *G06F 17/5031* (2013.01); *G06F 17/5059* (2013.01); *G06F 17/5081* (2013.01); *H03K 3/0375* (2013.01); *G06F 2217/84* (2013.01)

(58) Field of Classification Search
CPC ............. G06F 17/5031; G06F 17/5081; G06F 2217/84
USPC ................................... 716/108, 113
See application file for complete search history.

(56) References Cited

U.S. PATENT DOCUMENTS

| 5,636,372 A | 6/1997 | Hathaway et al. |
|---|---|---|
| 2010/0253382 A1 | 10/2010 | Wang et al. |
| 2012/0182079 A1 | 7/2012 | Kim et al. |
| 2012/0262187 A1 | 10/2012 | Gebara et al. |
| 2015/0347653 A1* | 12/2015 | Sofer et al. ......... G06F 17/5031 716/113 |

OTHER PUBLICATIONS

International Search Report and Written Opinion correlating to PCT/IB2013/050151 issued on Sep. 27, 2013.

(Continued)

*Primary Examiner* — Sun Lin

(57) ABSTRACT

A method of calculating at least one delay timing value for at least one setup timing stage within an integrated circuit design includes applying Negative/Positive Bias Temperature Instability (N/PBTI) compensation margins to delay values for elements within the at least one setup timing stage, and calculating the at least one delay timing value for the at least one setup timing stage based at least partly on the N/PBTI compensation margins applied to the delay values. The method further includes identifying at least partially equivalent elements within the parallel timing paths of the at least one setup timing stage, and applying reduced N/PBTI compensation margins to delay values for the identified at least partially equivalent elements within parallel timing paths of the at least one setup timing stage.

13 Claims, 3 Drawing Sheets

(56) References Cited

OTHER PUBLICATIONS

J. B. Yang, T. P. Chen, S. S. Tan and L. Chan; "A novel empirical model for NBTI recovery with the modulated measurement time frame"; Proceedings of 13th IPFA 2006, Singapore, p. 33, 2006.
S. V. Kumar, C. H. Kim, S. S. Sapatnekar; "NBTI-Aware Synthesis of Digital Circuits"; Proceedings of the IEEE/ACM Design Automation Conference, Jun. 2007.
Hamed Abrishami et al., 'Multi-Corner, Energy-Delay Optimized, NBTI-Aware 1,7-10 Flip-Flop Design,' Symposium on Quality Electronic Design, 2010, pp. 652-659.
S.E. Esmaeili et al., 'Skew compensation in energy recovery clock 1-4,7-10 distribution networks,' IET Computers & Digital Techniques, 2010, vol. 4, No. 1, pp. 56-72.

\* cited by examiner

METHOD AND APPARATUS FOR CALCULATING DELAY TIMING VALUES FOR AN INTEGRATED CIRCUIT DESIGN

FIELD OF THE INVENTION

This invention relates to a method and apparatus for calculating delay timing values, and in particular to a method and apparatus for calculating at least one delay timing value for at least one setup timing stage within an integrated circuit design.

BACKGROUND OF THE INVENTION

In the field of modern VLSI (Very Large Scale Integration) integrated circuit (IC) devices, Metal Oxide Semiconductor Field Effect Transistor (MOSFET) devices often have rarely switching periods such as during low power modes, or are simply rarely switching devices, for example within control logic etc. During such periods of non-(or infrequent) switching, a MOSFET device is subjected to a constant bias voltage, which can result in the PMOSFET or NMOSFET device experiencing respectively Negative Bias Temperature Instability (NBTI) or Positive Bias Temperature Instability (PBTI) stress. N/PBTI stress can cause key reliability issues in MOSFET devices, and manifests as an increase in the threshold voltage (Vth) and consequently a decrease in the drain current and transconductance of the MOSFET device, which results in performance degradation of the MOSFET device.

In order to compensate for such performance degradation of MOSFET devices caused by NBTI/PBTI stress, it is conventional to provide additional margins within the delay of signal paths throughout the IC device, for example up to 10%. However, a problem with this conventional approach is that it introduces extra costs in terms of additional area, power and design effort across the entire IC device, including for those parts of the IC device that do not suffer from significant NBTI/PBTI stress, and thus which do not require such generous additional margins.

SUMMARY OF THE INVENTION

The present invention provides a method of calculating at least one delay timing value for at least one setup timing stage within an integrated circuit design, a method of performing static timing analysis of at least a part of an integrated circuit design, an apparatus comprising at least one signal processing module arranged to calculate at least one delay timing value for at least one setup timing stage within an integrated circuit design, and a non-transitory computer program product having executable program code stored therein for calculating at least one delay timing value for at least one setup timing stage within an integrated circuit design as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
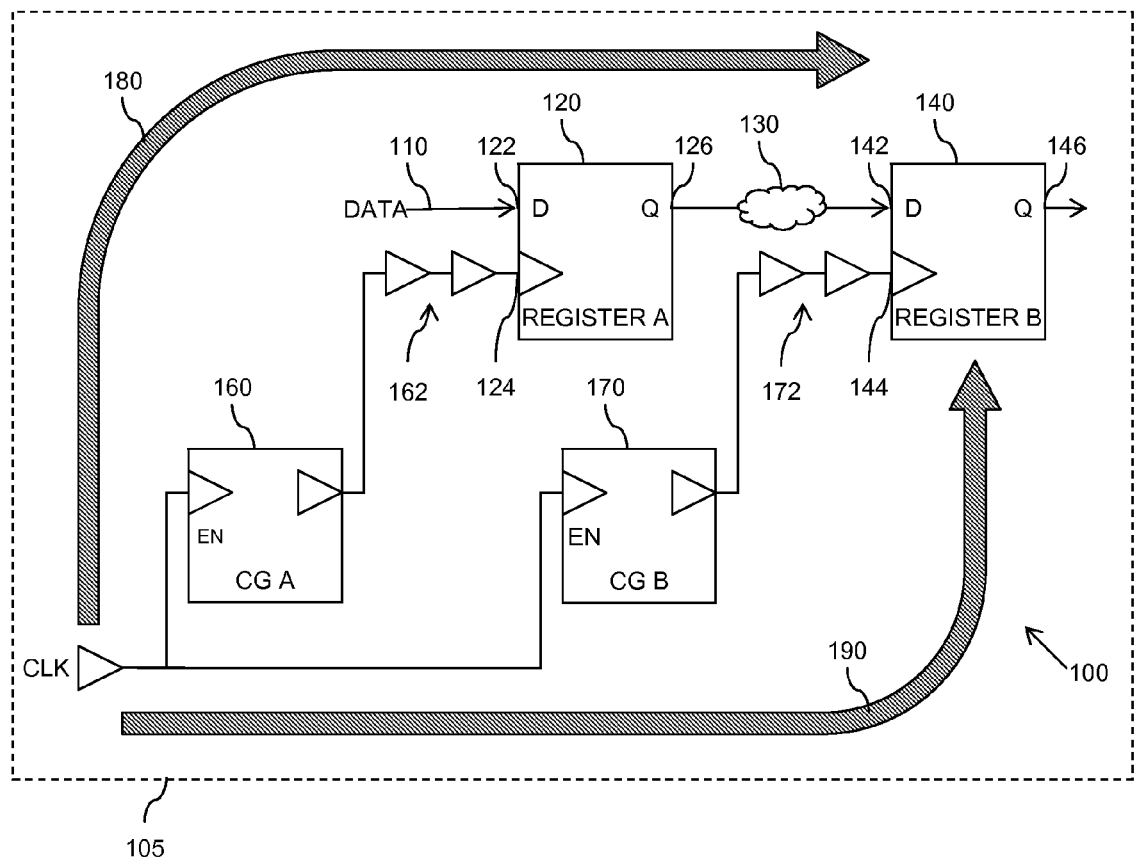
FIG. 1 illustrates a simplified block diagram of an example of a setup timing stage.

The present invention will now be described with reference to the accompanying drawings in which examples of a method and apparatus for calculating delay timing values for setup timing stages within an integrated circuit (IC) design are described and illustrated. However, it will be appreciated that the present invention is not limited to the specific examples illustrated and described herein. For example, the present invention is not limited to the simplified examples of calculating delays herein described with reference to the accompanying drawings. Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In accordance with some examples, there is provided a method and apparatus for calculating at least one delay timing value for at least one setup timing stage within an integrated circuit design. The method comprises applying Negative/Positive Bias Temperature Instability (N/PBTI) compensation margins to delay values for elements within the at least one setup timing stage, and calculating the at least one delay timing value for the at least one setup timing stage based at least partly on the N/PBTI compensated delay values. The method further comprises identifying at least partially equivalent elements within parallel timing paths of the at least one setup timing stage, and applying reduced N/PBTI compensation margins to the identified at least partially equivalent elements within parallel timing paths of the at least one setup timing stage.

In this manner, by applying reduced N/PBTI compensation margins to at least partially equivalent elements within parallel timing paths of a setup timing stage, the costs in terms of area, power and design effort for that setup timing stage may be significantly reduced, substantially without increasing the risk from performance degradation as a result of N/PBTI stress of MOSFET devices within those (at least partially) equivalent elements.

For example, the method may comprise applying no N/PBTI compensation margin to identified equivalent elements within parallel timing paths of the at least one setup timing stage, and/or applying partially reduced N/PBTI compensation margins to identified partially equivalent elements within parallel timing paths of the at least one setup timing stage.

In some further examples, the method may comprise applying default N/PBTI compensation margins to delay values for elements within the at least one setup timing stage, identifying at least partially equivalent elements within parallel timing paths of the at least one setup timing stage, and reducing the N/PBTI compensation margins applied to the identified at least partially equivalent elements within parallel timing paths of the at least one setup timing stage.

In some still further examples, the method may comprise applying default N/PBTI compensation margins to delay values for elements within the at least one setup timing stage, calculating at least one delay timing value for the at least one setup timing stage based at least partly on the delay values to which default N/PBTI compensation margins have been applied, and determining whether timing constraints have been met based on the at least one delay timing value calculated using the delay values to which default N/PBTI compensation margins have been applied. If at least one timing constraint has not been met, the method may further comprise identifying at least partially equivalent elements within parallel timing paths of the at least one setup timing stage, reducing the N/PBTI compensation margins applied to the identified at least partially equivalent elements within parallel timing paths of the at least one setup timing stage, and recalculating the at least one delay timing value for the at least one setup timing stage based at least partly on the delay values to which reduced N/PBTI compensation margins have been applied.

According to a further aspect of the invention there is provided a method and apparatus for performing static timing analysis of at least a part of an integrated circuit design, the method comprising calculating at least one delay timing value for at least one setup timing stage within the integrated circuit design in accordance with the method described above.

Referring first to FIG. 1, there is illustrated a simplified block diagram of an example of a setup timing stage 100 that may be implemented within an IC device 105. Such a setup timing stage typically comprises two signal path components: a data path component and a clock path component.

Starting with the data path component of the setup timing stage 100, a data signal 110 is received at a data input 122 of a first clocked element 120 of the setup timing stage 100. Upon receipt of a 'capture' edge at a clock input 124 of the first clocked element 120, the first clocked element 120 captures the data signal 110 received at its data input 122 and applies the captured signal to an output 126 thereof. Upon subsequent receipt of a 'hold' edge at the clock input 124 of the first clocked element 120, the first clocked element 120 latches and holds the signal at its output 126. In this manner, even if the signal at the data input 122 changes, the signal applied to the output 126 remains unchanged.

The data signal 110 applied to the output 126 of the first clocked element 120 is propagated along a data path 130, which may comprise various logic elements such as, for example, combinational logic elements etc. The data path 130 terminates at a data input 142 of a second clocked element 140 of the setup timing stage 100. In a similar manner as for the first clocked element 120, upon receipt of a capture edge at a clock input 144 of the second clocked element 140, the second clocked element 140 captures the data signal 110 received at its data input 142 and applies the captured signal to an output 146 thereof. Upon subsequent receipt of a hold edge at the clock input 144 of the second clocked element 140, the second clocked element 140 latches and holds the signal at its output 146.

Referring now to the clock path component of the setup timing stage 100, a clock signal 150 is provided to the clock inputs 124, 144 of the clocked elements 120, 140, and may be propagated through a number (zero or more) of circuit elements such as delay elements, clock gating elements, etc. In the example illustrated in FIG. 1, the clock signal 150 is propagated through a clock gating element 160 and a number of further clock path elements illustrated generally at 162 before being received at the clock input 124 of the first clocked element 120, and is propagated through a clock gating element 170 and a number further clock path element illustrated generally at 172 before being received at the clock input 144 of the second clocked element 140.

Thus, in the setup timing stage 100 illustrated in FIG. 1, upon receipt of a capture edge of a first clock cycle at the clock input 124 of the first clocked element 120, the data signal 110 received at the data input 122 of the first clocked element 120 is captured and output 126 by the first clocked element 120. The data signal 110 then propagates through the data path 130 to the data input 142 of the second clocked element 140. The data signal 110 is subsequently latched and held at the output 126 of the first clocked element 120 upon subsequent receipt of a hold edge of the first clock cycle at the clock input 124 of the first clocked element 120.

In order to avoid a setup time violation within the setup timing stage 100, the data signal 110 is required to propagate through the data path 130 and reach the data input 142 of the second clocked element 140 before a capture edge of a second clock cycle (immediately following the first clock cycle) is received at the clock input 144 of the second clocked element 140, otherwise invalid data received at the data input 142 may be output by the second clocked element 140. Similarly, in order to avoid a hold time violation within the setup timing stage 100, the data signal 110 must not propagate through the data path 130 too quickly such that it reaches the data input 142 of the second clocked element 140 before the hold edge of the first clock cycle has been received at the clock input 144 of the second clocked element 140.

Accordingly, in order to avoid a setup time violation, the propagation time ($t_p$) for the data signal 110 to propagate from the first clocked element 120, through the data path 130 to the second clocked element 140 must be less than one clock cycle $+\Delta_{clk}$, where $\Delta_{clk}$ represents a difference between the propagation times for the clock signal 150 to propagate through to the respective clock inputs 124, 144 of the clocked elements 120, 140. Thus, in order to avoid a setup time violation for a given clock cycle duration:

$$t_p - \Delta_{clk} < Clk\_cycle \qquad \text{[Equation 1]}$$

Similarly, in order to avoid a hold time violation, the propagation time ($t_p$) for the data signal 110 to propagate from the first clocked element 120, through the data path 130 to the second clocked element 140 must be greater than one clock cycle $-\Delta_{clk}$. Thus, in order to avoid a hold time violation for a given clock cycle duration:

$$t_p + \Delta_{clk} > Clk\_cycle \qquad \text{[Equation 2]}$$

The propagation time ($t_p$) may be calculated based on, for example, predefined delay values for each circuit element within the data path component of the setup timing stage 100, including the first and second clocked elements 120,

140. Thus, in the example illustrated in FIG. 1, the propagation time ($t_p$) may be calculated as:

$$t_p = del\_RegA + del\_dp + del\_RegB \quad \text{[Equation 3]}$$

where del_RegA represents a delay value for the first clocked element, del_dp represents a delay value for the data path 130, and del_RegB represents a delay value for the second clocked element 140. It will be appreciated that for simplicity and ease of understanding a single delay value del_dp has been used to represent the delay of the data path 130. However, where the data path 130 comprises multiple elements, for example multiple combinational logic elements, separate delay values for each (or groups of) elements within the data path 130 may be used to calculate the propagation time ($t_p$).

Similarly, the $\Delta_{clk}$ may be calculated based on, for example, predefined delay values for each element within the clock path component of the setup timing stage 100. Thus, in the example illustrated in FIG. 1, $\Delta_{clk}$ may be calculated as:

$$\Delta_{clk} = (del\_CGB + del\_nB) - (del\_CGA + del\_nA) \quad \text{[Equation 4]}$$

Where del_CGA represents a delay value for the clock gating element 160, del_nA represents a delay value for the further clock path elements 162, del_CGB represents a delay value for the clock gating element 170, and del_nB represents a delay value for the further clock path elements 172. Once again, it will be appreciated that for simplicity and ease of understanding single delay values del_nA and del_nB have been used to represent the delays of the further clock path elements 162, 172. However, where there are multiple elements in each clock path, separate values for each (or groups of) elements within the respective clock path may be used to calculate $\Delta_{clk}$.

The various elements that make up a setup timing stage such as the setup timing stage 100 illustrated in FIG. 1, are typically formed of Metal Oxide Semiconductor Field Effect Transistor (MOSFET) devices, along with various other circuit components as is well known in the art. Accordingly, the MOSFET devices, and thus the higher level elements themselves, are prone to Negative Bias Temperature Instability (NBTI) and Positive Bias Temperature Instability (PBTI) stress. In order to take into consideration variations within the functioning of physical IC devices, for example such as due to NBTI and PBTI stress, it is conventional to apply margins to the delays in order to avoid field failures caused by such variations. For example, when calculating the propagation time ($t_p$) and $\Delta_{clk}$ in order to verify whether a setup timing violation may occur within the setup timing stage 100 such margins may be applied to the delay values used to calculate the propagation time ($t_p$), i.e. to the del_RegA, del_dp, and del_RegB values in the illustrated example, and to the delay values used to calculate $\Delta_{clk}$ for the elements in the clock path to the first clocked element 120, i.e. to the del_CGA and del_nA values in the illustrated example. Conversely, when calculating the propagation time ($t_p$) and $\Delta_{clk}$ in order to verify whether a hold timing violation may occur within the setup timing stage 100 such margins may be applied to the delay values used to calculate $\Delta_{clk}$ for the elements in the clock path to the second clocked element 140, i.e. to the del_CGA and del_nA values.

As identified in the background of the invention, it is conventional to provide additional N/PBTI compensation margins within the delay of signal paths throughout the IC design, for example up to 10%. However, a problem with this conventional approach is that it introduces extra costs in terms of additional area, power and design effort across the entire IC device, including for those parts of the IC device that do not suffer from significant NBTI/PBTI stress, and thus which do not require such generous additional margins.

In contrast to this conventional approach of applying a default N/PBTI compensatory margin to setup timing stage delay values throughout an IC design, examples of the present invention comprise applying a reduced N/PBTI compensatory margin, or in some examples no such margin, to setup timing stage delay values for elements within a respective setup timing stage for which logically equivalent elements exist within parallel timing paths of the setup timing stage.

For example, in the setup timing stage 100 illustrated in FIG. 1, the clock path component comprises two clock gating elements 160, 170; one in each of the clock paths to the respective clocked elements 120, 140. The setup timing stage 100 may be considered as comprising two parallel timing paths: 1) a first timing path 180 from the common clock signal 150, through the clock path to the first clocked element 120, and through the data path 130 to the second clocked element 140; and 2) a second timing path 190 from the common clock signal 150 through the clock path to the second clock element 140. In the illustrated example, each of these timing paths 180, 190 comprises a logically equivalent clock gating element 160, 170. The inventors have recognised that such equivalent elements will be subjected to substantially the same N/PBTI stress conditions, and thus the effect on the performance of these equivalent elements caused by N/PBTI stress will be substantially the same also. Accordingly, a significantly reduced N/PBTI compensatory margin may be applied to the delays for such equivalent elements, and potentially no such margin need be applied, since the complementary effect on performance on the equivalent elements substantially counter balance each other.

Figure 2:
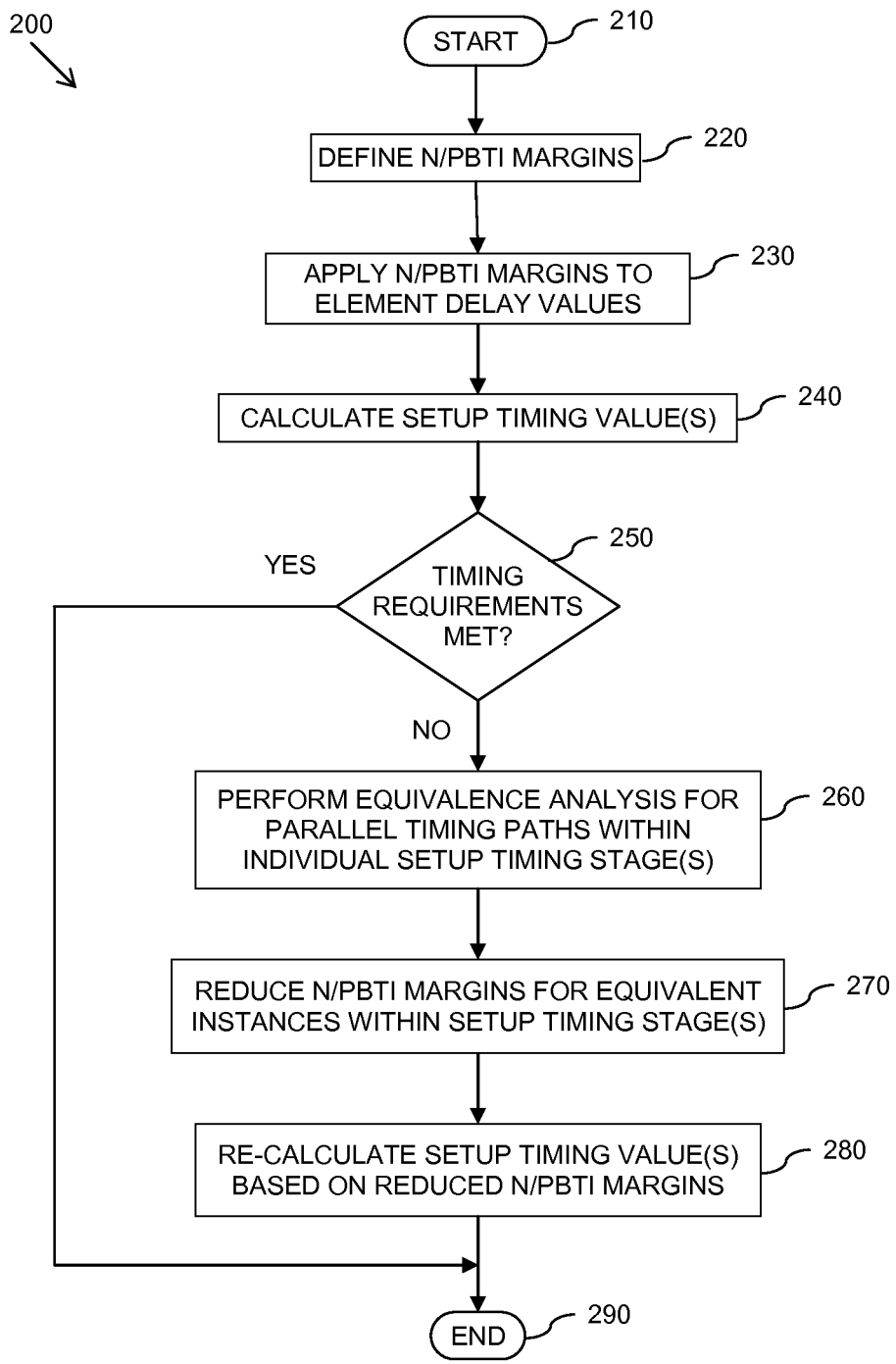
FIG. 2 illustrates a simplified flowchart of an example of a method of calculating at least one delay timing value for at least one setup timing stage within an integrated circuit design.

Referring now to FIG. 2, there is illustrated a simplified flowchart 200 of an example of a method of calculating at least one delay timing value for at least one setup timing stage within an integrated circuit design, such as may form a part of a method of performing static timing analysis of at least a part of an integrated circuit design. The method starts at 210, and moves on to 220 where N/PBTI compensation margins are defined. For example, one or more default N/PBTI compensation margin(s) of, say, 8-10% may be defined. In addition, one or more reduced N/PBTI compensation margins may be defined. For example, a first reduced N/PBTI compensation margin of, say, 0% may be defined for equivalent elements, whilst one or more further reduced N/PBTI compensation margin(s) of, say, 4-5% may also be defined for partially equivalent elements. Examples of partially equivalent elements may comprise, say, elements comprising similar switching activity but which are not physically equivalent such as inverters or buffers of different drive strength or different layout.

The method then moves on to 230, where in the illustrated example the default N/PBTI compensation margin(s) is/are applied to delay values for elements within the setup timing stage(s). One or more delay timing value(s) for the setup timing stage(s) is/are then calculated based at least partly on the delay values to which default N/PBTI compensation margin(s) has/have been applied, at 240.

For example, such a delay timing value may be calculated to provide an indication of whether a setup timing violation is likely to occur within the setup timing stage for a particular clock frequency, such as based on Equation 1 above. As such, in the illustrated example and as described above, the default N/PBTI compensation margin(s) may be applied to the delay values used to calculate the propagation time ($t_p$), i.e. to the del_RegA, del_dp, and del_RegB delay values, and to the delay values used to calculate $\Delta_{clk}$ for the elements in the clock path to the first clocked element 120, i.e. to the del_CGA and del_nA delay values.

Additionally/alternatively, such a delay timing value may be calculated to provide an indication of whether a hold timing violation is likely to occur within the setup timing stage for a particular clock frequency, such as based on Equation 2 above. As such, in the illustrated example and as described above, the default N/PBTI compensation margin(s) may be applied to the delay values used to calculate $\Delta_{clk}$ for the elements in the clock path to the second clocked element 140, i.e. to the del_CGA and del_nA delay values.

In the example illustrated in FIG. 2, the method then moves on to 250, where it is determined whether timing requirements for the setup timing stage(s) is/are met based on the calculated delay timing value(s) for the setup timing stage(s). For example, if it is determined that a setup timing violation and/or a setup hold violation is likely to occur within a setup timing stage for a particular clock frequency, then it may be determined that the timing requirements for that setup timing stage are not met.

If it is determined that the timing requirements for a setup timing stage are met, then in the illustrated example the method ends at 290. In this manner, further design effort need not be wasted unnecessarily. However, if it is determined that the timing requirements for a setup timing stage are not met, the method moves on to 260 where equivalence analysis of parallel timing paths within that setup timing stage is performed to identify at least partially equivalent elements within the parallel timing paths of the setup timing stage. For example, and as described above, the setup timing stage 100 illustrated in FIG. 1 comprises two parallel timing paths 180, 190, each of these timing paths 180, 190 comprising a logically equivalent clock gating element 160, 170.

Next, at 270, the method comprises reducing the N/PBTI compensation margins applied to the identified at least partially equivalent elements within parallel timing paths of the setup timing stage(s). For example, a first reduced N/PBTI compensation margin of, say, 0% may be applied to the delay values for equivalent elements, whilst one or more partially reduced N/PBTI compensation margin(s) of, say, 4-5% may be applied to the delay values for partially equivalent elements. The delay timing value(s) for the setup timing stage(s) may then be recalculated based at least partly on the delay values to which reduced N/PBTI compensation margin(s) has/have been applied, at 280. The method then ends at 290.

It will be appreciated that where no equivalent, or partially equivalent, elements are identified within a setup timing stage, step 270 and 280 of the method of FIG. 2 may be omitted for that setup timing stage.

Figure 3:
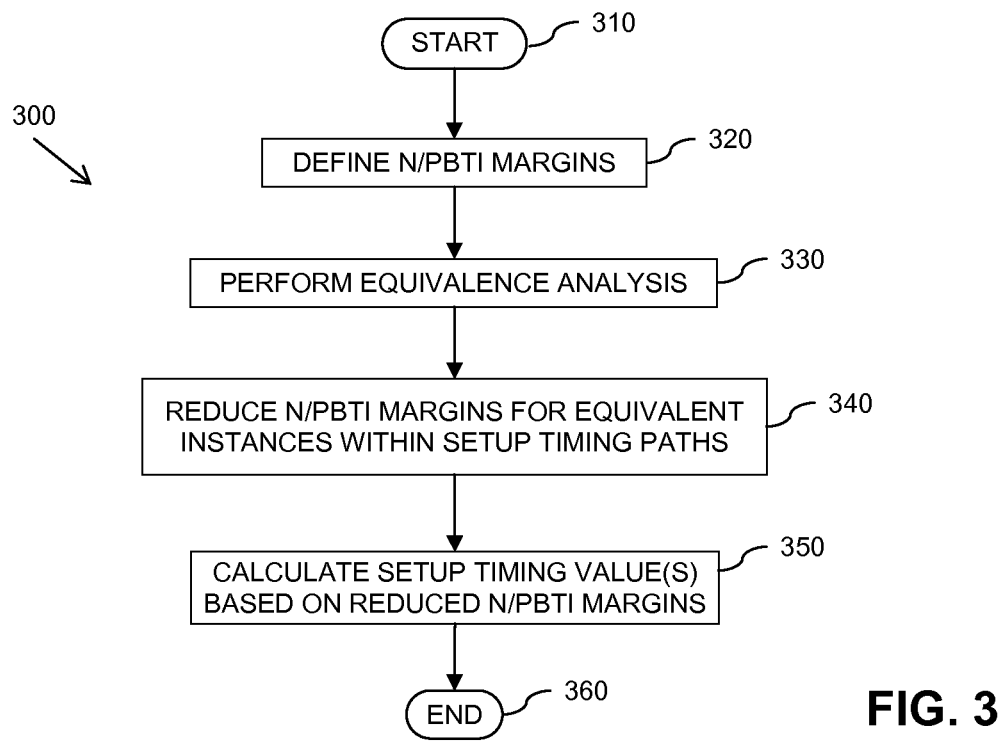
FIG. 3 illustrates a simplified flowchart of an alternative example of a method of calculating at least one delay timing value for at least one setup timing stage within an integrated circuit design.

In the example illustrated in FIG. 2, initial delay timing values are calculated using only default N/PBTI compensation margins prior to identifying (partially) equivalent elements and applying reduced N/PBTI compensation margins if the timing requirements of the setup timing stage are not met. However, in some examples the calculation of initial timing values using only default N/PBTI compensation margins may be omitted to simplify the method. FIG. 3 illustrates a simplified flowchart 300 of such an alternative example of a method of calculating at least one delay timing value for at least one setup timing stage within an integrated circuit design. In the example illustrated in FIG. 3, the method starts at 310, and moves on to 320 where N/PBTI compensation margins are defined. Next, at 330, equivalence analysis of parallel timing paths within that setup timing stage is performed to identify at least partially equivalent elements within the parallel timing paths of the setup timing stage. Next, at 340, the method comprises reducing the N/PBTI compensation margins applied to the identified at least partially equivalent elements within parallel timing paths of the setup timing stage(s). The delay timing value(s) for the setup timing stage(s) are then calculated based at least partly on the delay values to which reduced N/PBTI compensation margin(s) has/have been applied, at 350, and the method then ends at 360.

Figure 4:
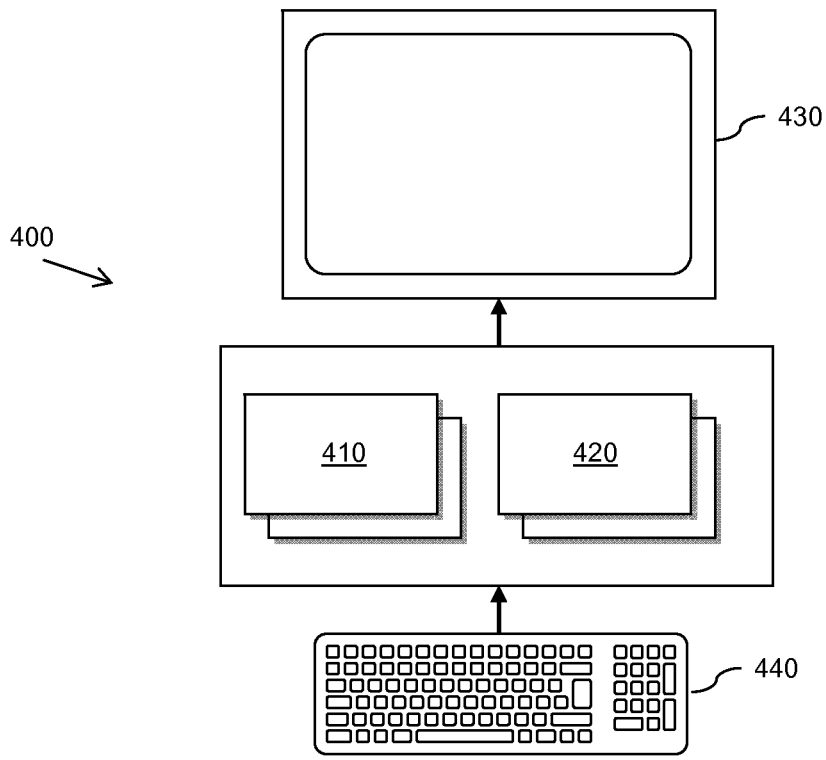
FIG. 4 illustrates a simplified block diagram of an example of an apparatus arranged to perform a method of calculating delay timing values for setup timing stages within integrated circuit designs.

Referring now to FIG. 4, there is illustrated a simplified block diagram of an example of an apparatus 400 arranged to perform a method of calculating delay timing values for setup timing stages within integrated circuit designs, such as one of the methods illustrated in FIG. 2 and/or FIG. 3 and described above. In the illustrated example, the apparatus comprises one or more signal processing modules 410 operably coupled to one or more memory elements 420. The apparatus may further comprise one or more user interface components, such as a display 430 and keyboard 440. The signal processing module(s) may be arranged to execute computer program code stored within the memory element(s) 420. The memory element(s) 420 may comprise any form of non-transitory computer program product, such as a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

In some examples, the signal processing module(s) 410 is/are arranged to execute computer program code operable for applying Negative/Positive Bias Temperature Instability (N/PBTI) compensation margins to delay values for elements within setup timing stages within integrated circuit designs, and calculating at least one delay timing value for the setup timing stages based at least partly on the N/PBTI compensated delay values. The computer program code is further operable for identifying at least partially equivalent elements within parallel timing paths of the at least one setup timing stage, and applying reduced N/PBTI compensation margins to the delay values of the identified at least partially equivalent elements within parallel timing paths of the at least one setup timing stage.

Thus, the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of calculating at least one delay timing value for at least one setup timing stage within an integrated circuit design, the method comprising:
applying Negative/Positive Bias Temperature Instability (N/PBTI) compensation margins to delay values for elements within the at least one setup timing stage; and
calculating the at least one delay timing value for the at least one setup timing stage based at least partly on the N/PBTI compensation margins applied to the delay values;
identifying at least partially equivalent elements within parallel timing paths of the at least one setup timing stage; and
applying reduced N/PBTI compensation margins to the delay values for the identified at least partially equivalent elements within the parallel timing paths of the at least one setup timing stage.

2. The method of claim 1, wherein the method further comprises:
applying default N/PBTI compensation margins to delay values for elements within the at least one setup timing stage;
identifying at least partially equivalent elements within parallel timing paths of the at least one setup timing stage; and
reducing the default N/PBTI compensation margins applied to the identified at least partially equivalent elements within parallel timing paths of the at least one setup timing stage.

3. The method of claim 1, wherein the method further comprises:
applying default N/PBTI compensation margins to delay values for elements within the at least one setup timing stage;
calculating at least one delay timing value for the at least one setup timing stage based at least partly on the delay values to which the default N/PBTI compensation margins have been applied;
determining whether timing constraints have been met based on the at least one delay timing value calculated using the delay values to which the default N/PBTI compensation margins have been applied; and
if at least one timing constraint has not been met:
identifying at least partially equivalent elements within parallel timing paths of the at least one setup timing stage;
reducing the default N/PBTI compensation margins applied to delay values for the identified at least partially equivalent elements within the parallel timing paths of the at least one setup timing stage; and
recalculating the at least one delay timing value for the at least one setup timing stage based at least partly on the delay values to which the reduced N/PBTI compensation margins have been applied.

4. The method of claim 1,
wherein the method comprises applying no N/PBTI compensation margin to the delay values for the identified equivalent elements within the parallel timing paths of the at least one setup timing stage.

5. The method of claim 1,
wherein the method comprises applying partially reduced N/PBTI compensation margins to the delay values for the identified partially equivalent elements within the parallel timing paths of the at least one setup timing stage.

6. A method of performing static timing analysis of at least a part of an integrated circuit design, the method comprising calculating at least one delay timing value for at least one setup timing stage within the integrated circuit design in accordance with claim 1.

7. An apparatus comprising at least one signal processing module arranged to calculate at least one delay timing value for at least one setup timing stage within an integrated circuit design, the at least one signal processing module being arranged to:
- apply Negative/Positive Bias Temperature Instability (N/PBTI) compensation margins to delay values for elements within the at least one setup timing stage;
- calculate the at least one delay timing value for the at least one setup timing stage based at least partly on the N/PBTI compensation margins applied to the delay values;
- identify at least partially equivalent elements within parallel timing paths of the at least one setup timing stage; and
- apply reduced N/PBTI compensation margins to the delay values of the identified at least partially equivalent elements within the parallel timing paths of the at least one setup timing stage.

8. The apparatus of claim 7, wherein the at least one signal processing module is arranged to calculate at least one delay timing value for at least one setup timing stage within an integrated circuit design as part of performing static timing analysis of the at least one setup timing stage of the integrated circuit design.

9. An article of manufacture including at least one non-transitory, tangible machine readable storage medium containing instructions that, when executed by a machine, cause the machine to calculate at least one delay timing value for at least one setup timing stage within an integrated circuit design, the instructions comprising:
- applying Negative/Positive Bias Temperature Instability (N/PBTI) compensation margins to delay values for elements within the at least one setup timing stage; and
- calculating the at least one delay timing value for the at least one setup timing stage based at least partly on the N/PBTI compensation margins applied to the delay values;
- identifying at least partially equivalent elements within parallel timing paths of the at least one setup timing stage; and
- applying reduced N/PBTI compensation margins to the delay values for the identified at least partially equivalent elements within the parallel timing paths of the at least one setup timing stage.

10. The article of claim 9, wherein the instructions further comprise:
- applying default N/PBTI compensation margins to delay values for elements within the at least one setup timing stage;
- identifying at least partially equivalent elements within parallel timing paths of the at least one setup timing stage; and
- reducing the default N/PBTI compensation margins applied to the identified at least partially equivalent elements within parallel timing paths of the at least one setup timing stage.

11. The article of claim 9, wherein the instructions further comprise:
- applying default N/PBTI compensation margins to delay values for elements within the at least one setup timing stage;
- calculating at least one delay timing value for the at least one setup timing stage based at least partly on the delay values to which the default N/PBTI compensation margins have been applied;
- determining whether timing constraints have been met based on the at least one delay timing value calculated using the delay values to which the default N/PBTI compensation margins have been applied; and
- if at least one timing constraint has not been met:
  - identifying at least partially equivalent elements within parallel timing paths of the at least one setup timing stage;
  - reducing the default N/PBTI compensation margins applied to delay values for the identified at least partially equivalent elements within the parallel timing paths of the at least one setup timing stage; and
  - recalculating the at least one delay timing value for the at least one setup timing stage based at least partly on the delay values to which the reduced N/PBTI compensation margins have been applied.

12. The article of claim 9, wherein the instructions further comprise:
- applying no N/PBTI compensation margin to the delay values for the identified equivalent elements within the parallel timing paths of the at least one setup timing stage.

13. The article of claim 9, wherein the instructions further comprise:
- applying partially reduced N/PBTI compensation margins to the delay values for the identified partially equivalent elements within the parallel timing paths of the at least one setup timing stage.

* * * * *